May 12, 1931. L. LAGARDE 1,805,407
COMBINED TRAPPING AND ELECTROCUTING APPARATUS
Filed June 24, 1929 2 Sheets-Sheet 2
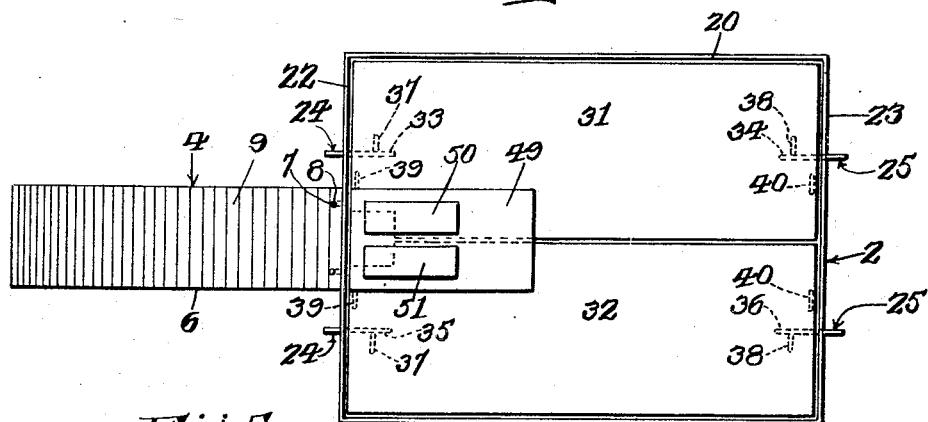
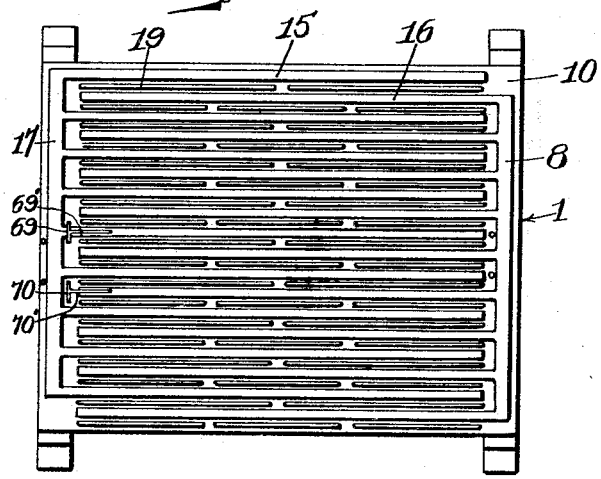
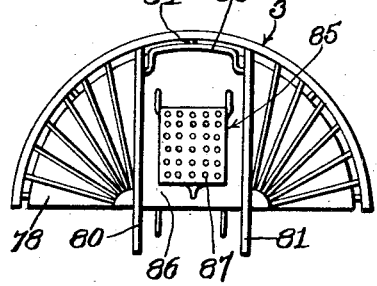
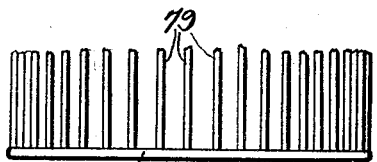
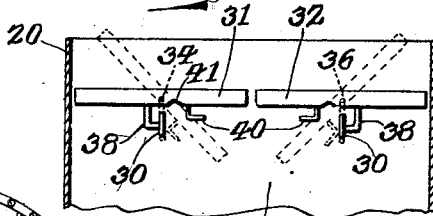
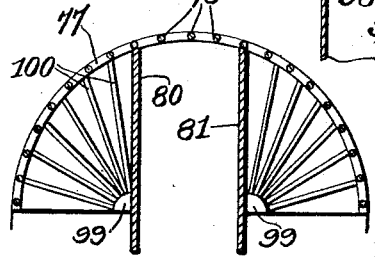
INVENTOR.
Leoncio Lagarde,
BY
Geo. P. Kimmel
ATTORNEY.

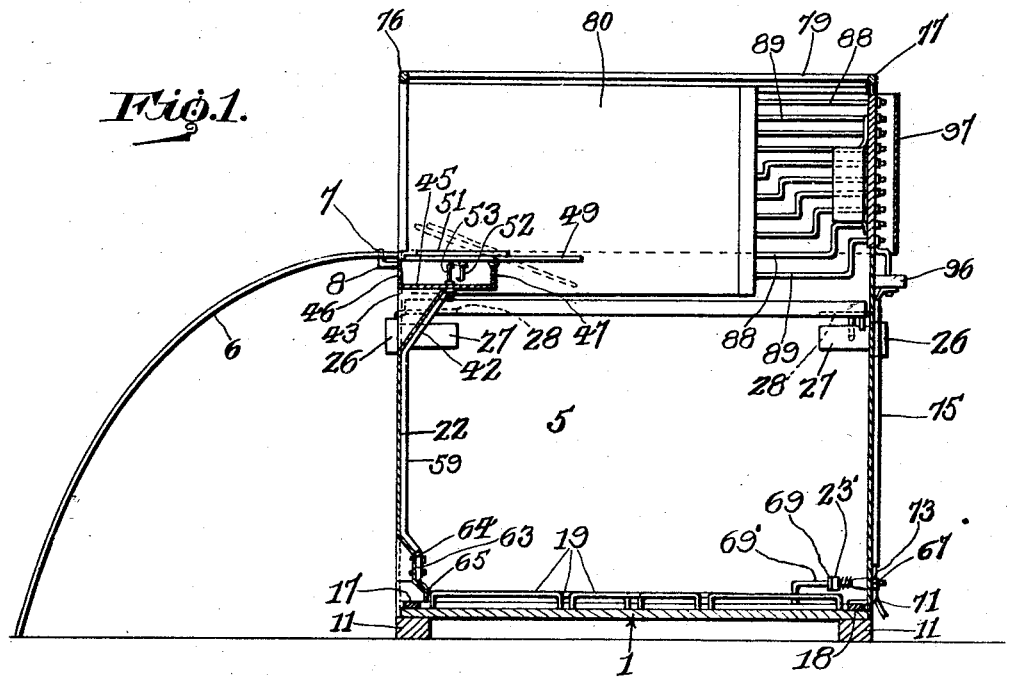
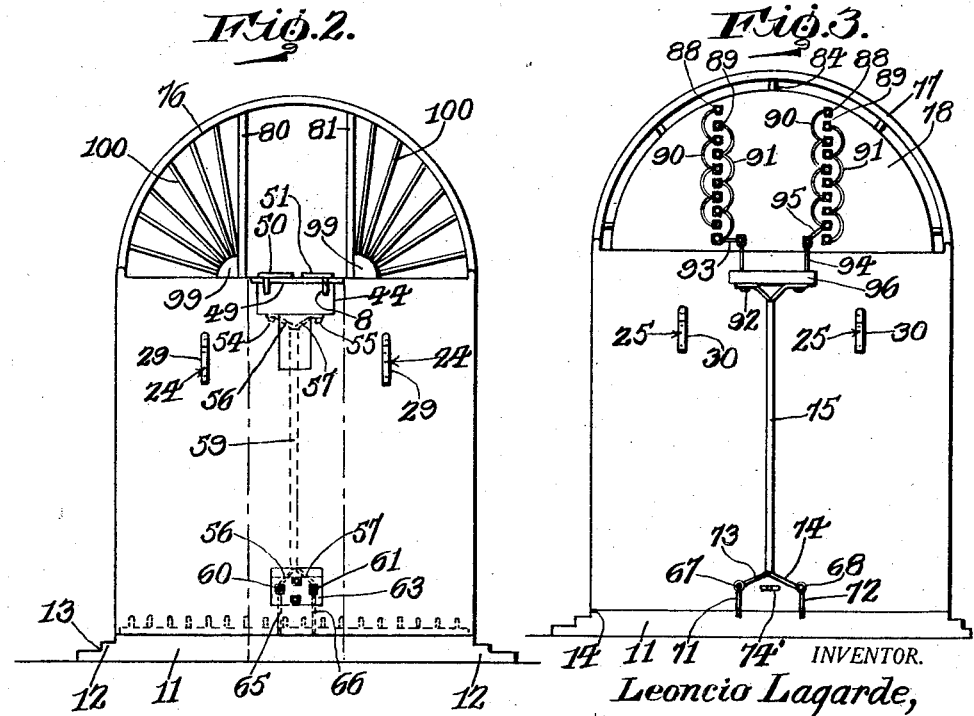

Patented May 12, 1931

1,805,407

UNITED STATES PATENT OFFICE

LEONCIO LAGARDE, OF MEXICO, MEXICO, ASSIGNOR OF ONE-HALF TO CELSO MARTINEZ, OF MEXICO, D. F., MEXICO

COMBINED TRAPPING AND ELECTROCUTING APPARATUS

Application filed June 24, 1929. Serial No. 373,459.

This invention relates to a combined trapping and electrocuting apparatus designed primarily for the trapping and electrocuting of rodents, more particularly rats, and has for its object to provide, in a manner as hereinafter set forth, an apparatus of the class referred to for electrocuting, immediately after being trapped, a rodent without the shedding of blood by it, under such conditions resulting in the rodent approaching and entering the trap, which would not be the case if the smell of blood were present.

A further object of the invention is to provide, in a manner as hereinafter set forth, a combined trapping and electrocuting apparatus for the purpose referred to which can be quickly assembled and disassembled and readily cleaned when desired to remove all odors which would be obnoxious to rodents and act to prevent them from approaching and entering the apparatus.

A further object of the invention is to provide, in a manner as hereinafter set forth, an apparatus of the class referred to including a trapping chamber having the bottom thereof provided with electrodes and further provided with means for supporting the rodents in spaced relation with respect to the electrodes after the rodent has been deposited in the trapping chamber and electrocuted.

Further objects of the invention are to provide, in a manner as hereinafter set forth, a combined trapping and electrocuting apparatus which is comparatively simple in its construction and arrangement, strong, durable, thoroughly efficient in its use, capable of being expeditiously cleaned when occasion requires, positive in its action, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a longitudinal sectional view of a combined trapping and electoructing apparatus in accordance with this invention.

Figure 2 is a front elevation thereof with the run-way removed.

Figure 3 is a rear elevation thereof with the cover plate for the wire connections removed.

Figure 4 is a top plan view of the apparatus with the top thereof removed.

Figure 5 is a top plan view of the bottom of the apparatus.

Figure 6 is a front elevation looking towards the top section of the apparatus.

Figure 7 is a fragmentary view in plan of the top section of the apparatus.

Figure 8 is a fragmentary view partly in section illustrating the trap doors.

Figure 9 is a transverse sectional view of the top section of the apparatus.

Figure 10 is a perspective view illustrating the form of removable pivot employed for the trap doors.

The apparatus includes a bottom section, a body section, a top section and a run-way referred to generally at 1, 2, 3 and 4 respectively. Said several sections are detachably connected together to enable the apparatus to be quickly dismantled and cleaned when desired and then readily assembled for trapping and electrocuting purposes. The body section is of polygonal contour and is adapted to be mounted upon the bottom section and such arrangement provides a trapping chamber 5. The body section 2 is open at its top and bottom and upon the top of said body section 2 is mounted the top section 3. The top section 3 is of arcuate contour. The run-way 4 can be of any suitable form but as shown consists of a curved strip 6 of any suitable material and of any suitable width and which is adapted to be detachably connected to the front of the body section 2 and for such purpose the upper end of the strip 6 is provided with openings 7, through which extend angle-shaped connecting members 8 which project forwardly from the top of the front of the body section 2. The strip 6 is formed with transversely extending, spaced step members 9.

The bottom section 1 includes a floor member 10 of non-conducting material, preferably fibrous and which conforms in contour to the shape of the body section 2. Secured to the lower face of member 10 is a pair of narrow, spaced supports 11 therefor, preferably formed from wood. The supports 11 are of a length to have the end portions 12 thereof extend from opposite sides of the member 10. The upper face of each end portion 12 is stepped as at 13 and the side edges of floor member 10 are flush with the upper riser 14 of said end portions 12. The front and rear edges of the floor member 10 are flush with the outer sides of the supports 11.

Secured upon the upper face of the floor member 10 is a pair of oppositely extending sets of spaced electrodes. The electrodes of one set are indicated at 15 and those of the other set at 16. The electrodes 15 are alternately disposed with respect to the electrodes 16, disposed in parallelism with respect therewith but spaced therefrom. A connector 17 is common to the electrodes 15 and a connector 18 is common to the electrodes 16. The connectors 17, 18 are formed of the same material as the electrodes 15, 16 and as shown the electrodes 15 are integral with the connector 17 and extend rearwardly with respect thereto and the electrodes 16 are integral with the connector 17 and project forwardly with respect thereto.

Secured to the floor member 10 and projecting upwardly therefrom and of a height greater than the height of the electrodes are inverted, yoke-shaped supports 19 acting as a means to support a rodent, after he has been electrocuted in spaced relation with respect to the electrodes. The supports 19 are of equal height and a plurality of supports are arranged between each pair of electrodes. The supports 19 are constructed of wire of the desired gauge.

The body member 2 includes a pair of side walls 20, 21, a front wall 22 and a rear wall 23. The front and rear walls 22, 23 in proximity to the top thereof are formed with slots which are vertically disposed, and each of such walls has the slots therein arranged in a pair and with the slots of the pair spaced from each other. Extending through the slots in the front wall 22 are pivot forming elements 24 and extending through the slots formed in the wall 23 are pivot forming elements 25. The pivot forming elements are of like construction and each consists of a T-shaped body comprising a head 26, a stem 27 and an arm of circular cross section indicated at 28 and which is integral with the head 26, offset with respect thereto and arranged in parallel spaced relation with respect to the stem 27. See Figure 10.

The slots formed in the wall 22 are indicated at 29 and the slots formed in the wall 23 are indicated at 30. The slots 29 are arranged in alignment with respect to the slots 30.

Positioned within the upper portion of the chamber 5 provided by the body section 2 is a pair of trap doors 31, 32 and each of which is pivotally supported by an element 24 and 25. The element 24 pivotally supports the trap door at its front and the element 25 pivotally supports the trap door at its rear. The trap doors 31, 32 normally close the top of the chamber 5 and when shifted to open such chamber assume the dotted line positions shown in Figure 8. The trap door 31 at its front and rear is provided with sockets 33, 34 respectively into the former of which extends the arm 28 of the element 24 and into the latter of which extends the arm 28 of the element 25. The trap door 32 is provided at its front and rear with sockets 35, 36 respectively, which receive the arms 28 of the elements 24, 25 respectively. The arrangement just stated provides for the elements 24, 25 pivotally supporting the trap doors 31, 32 within the chamber 5. Each trap door is provided with a pair of combined stop and counterbalancing members 37, 38 acting to maintain the trap doors in the position shown in Figure 8. The members 37, 38 abut against the stems 27 of the elements 24, 25 to maintain the trap doors in normally closed position, as indicated in full lines in Figure 8. Each of the trap doors is further provided with a pair of arrester members 39, 40 which contact with the stems 27 of the elements 24, 25 to limit the opening movement of the trap doors and in this connection see the dotted line showing in Figure 8. The lower faces of the trap doors are formed with notches 41 to provide clearances for the trap doors when they are swung to the dotted line position shown in Figure 8 and such notches will receive the top edges of the stems 27 of the elements 24 and 25. The width of the trap doors 31, 32 is such that when they are in normal position they will be arranged in close proximity to each other, and in this connection see Figure 4.

The elements 24 and 25 are removably mounted in the walls 22, 23 so that the trap doors can be readily disconnected from such elements when desired.

The wall 22 near its top is formed with inset parts 42 disposed at an upward inclination and is further formed with inwardly extending projections 43 which are integral with the parts 42 and the body of the wall 22. The wall 22 above the portions 42 is cut away as indicated at 44 and positioned in the cut away portion 44 and connected to the parts 42 and 43 is a support 45 provided with vertically disposed end pieces 46, 47, the former being flush with the outer face of the wall 22 and has the members 7 secured thereto and projecting outwardly therefrom. The end piece 47 has hinged to the top thereof, as as 48, a balanced, pivoted platform 49 carrying a pair of spaced electrodes 50, 51 on its upper face. Depending from the platform 49 and electrically connected with the electrodes 50, 51 are contact pieces 52 and carried by the support 45 are vertically disposed contact members 53 which are normally spaced from the contacts 52 and are engaged by the latter when the platform 49 is tilted to the dotted line position as shown in Figure 1, whereby the electrodes 50, 51 will be connected with a source of energy. The contact members 53 are connected to a pair of binding posts 54, 55. To the former is attached a circuit connection 56 and to the latter a circuit connection 57, and said connections are encased in a tube 59 arranged against the inner face of the wall 22 and extended against the inner face of the part 42 of the wall 22. The circuit connections 56, 57 are attached to binding posts 60, 61 respectively carried by a plate 63 secured to the inner face of an inset part 64 provided at the lower portion of the wall 22.

Extending from the binding posts 60, 61 are circuit connections 65, 66, the former being attached to one of the electrodes 15 and the latter to one of the electrodes 16.

Carried by the wall 23, at the lower portion thereof is a circuit closer 23' having a pair of binding posts 67, 68. The circuit closer 23' coacts with a pair of spaced contact plates 69, 70. Leading from the plate 69 to an electrode 15 is a circuit connection 69' and leading from plate 70 to an electrode 16 is a circuit connection 70'. The circuit connections leading from a suitable source of electrical energy to the posts 67, 68 are indicated at 71, 72 respectively. Leading from the posts 67, 68 are circuit connections 73, 74 respectively and which are encased in a tube 75 arranged against the outer face of the wall 23. The purpose of the circuit connections 73, 74 will be presently referred to. An operating means for the circuit closer 23' is indicated at 74'. The circuit closer 23' may be of the spring controlled type.

The top section 3 includes front and rear arch-shaped members 76, 77 respectively, the former being attached to the upper end of the wall 22 and the latter to the upper end of the wall 23. Connected to the member 77 is a closure plate 78, of segmental contour and which seats at its bottom on the top of the wall 23. The members 76 and 77 are connected together by electrical conductors 79 formed of suitable wire to form the top and sides of the section 3 of slotted skeleton type.

The top section 3 further includes a pair of vertically disposed, opposed, spaced plates or partitions 80, 81 of a height to depend below the ends of the members 76, 77. The partitions 80, 81 extend into the upper portion of the chamber 5 in proximity to the trap doors 31, 32. The partitions 80, 81 extend from the member 76 and terminate at a point a substantial distance from the plate 78. The partitions 80, 81 are arranged upon opposite sides of the platform 49 and depend below the support 45. The partitions 80, 81 are formed of suitable material and are connected together by a brace as indicated at 83, and such brace is arranged at the tops of the partitions.

The plate 88 is also attached or connected to the member 77 as indicated at 84. The partitions 80, 81 provide a passageway leading from the front of the apparatus in a direction towards a bait holder 85 which is secured to the inner face of the plate 78 and positioned a substantial distance from the rear end of the passageway 86 provided by the partitions 80, 81. The bait holder 85 has a perforated front as indicated at 87. The bait holder 85 is arranged above the rear portions of the trap doors 31, 32.

Extending from the inner end of each partition 80, 81 and insulated therefrom are, as at 80' two sets of electrical conductors which are adapted to be charged and are connected to, insulated from and extend through the plate 78. The electrical conductors of one set are indicated at 88 and those of the other set at 89. The sets of conductors 88 are electrically connected together, as indicated at 90 and the sets of conductors 89 are electrically connected together as at 91. The connections 90, 91 are arranged at the rear of plate 78. See Figure 3. The circuit connections 73 are attached to a binding post 92 and leading from the latter to a conductor 89 is a circuit connection 93. The circuit connection 74 is attached to a binding post 94 and leading therefrom to a conductor 88 is a circuit connection 95. The binding posts 92 and 94 are attached to a support 96. See Figure 3.

A cover 97 is provided for the rear ends of the conductors 88, 89 and such conductors may be termed electrodes.

Connected to the partitions 80, 81 near the lower ends of the front thereof are coupling members 99 and leading from the members 99 to the member 76 are radially disposed braces 100.

In connection with the manner in which the apparatus operates it will be stated that when the rodent travels up the run-way and enters into passage 86 he passes upon the platform 49 and as the circuit is open the rodent is not attacked by electricity because if the rodent were he would draw back from the apparatus. The rodent when entering the passage 86 travels upon the outer portion of platform 49. As the rodent travels upon the inner portion of platform 49 he will tilt the same whereby the contacts 52, 53 will cooperate to close the circuit and the rodent will get a shock in his back feet from the electrodes 50, 51, and which is so effective that the rodent jumps, falling on the trap doors, which open, and the rodent will be precipitated upon the bottom of chamber 5, contacting with the electrodes 15, 16 and will be electrocuted. The rodent will, when falling into the trapping chamber 5, stand on its feet thus being electrocuted and when falling over will rest on the wire grating or supports whereby he will be maintained in spaced relation with respect to the electrodes 15, 16. If the rodent should spring for the bait it will engage and close the circuit whereby the rodent will be shocked as it falls upon the platforms.

It is thought the many advantages of a combined trapping and electrocuting apparatus in accordance with this invention can be readily understood, particularly in view of the fact that the rodents are killed without shedding blood and also maintained in spaced relation with respect to the electrodes on the bottom of the trapping chamber, and although the preferred embodiment of the invention is as illustrated and described, yet it is to be understood that changes in the details of construction can be had which fall within the scope of the invention as claimed.

What I claim is:

1. In a combined trapping and electrocuting apparatus for rodents a trapping chamber having its bottom provided with oppositely disposed, spaced electrodes, means arranged between said electrodes for maintaining a rodent, after being electrocuted above and in spaced relation with respect to the electrodes, a pair of counterbalanced, oppositely shiftable, pivoted trap doors within said chamber near the top thereof for normally closing it, removable pivot elements for said trap doors, and means to provide a passageway above and of less length than said trap doors.

2. In a combined trapping and electrocuting apparatus for rodents a trapping chamber having its bottom provided with oppositely disposed, spaced electrodes normally in an open circuit, a pair of counterbalanced, oppositely shiftable, pivoted trap doors within said chamber for normally closing the upper portion thereof and adapted to be shifted to open position by a rodent on its precipitation to the chamber whereby the rodent will contact said electrodes thereby closing said circuit and electrocuting the rodent, and means arranged between said electrodes for maintaining the rodent after being electrocuted above and in spaced relation with respect to the electrodes.

3. In a combined trapping and electrocuting apparatus for rodents a trapping chamber having its bottom provided with oppositely disposed, spaced electrodes normally in an open circuit, a pair of counterbalanced oppositely shiftable, pivoted trap doors within said chamber for normally closing the upper portion thereof and adapted to be shifted to open position by a rodent on its precipitation to the chamber whereby the rodent will contact said electrodes thereby closing said circuit and electrocuting the rodent, means arranged between said electrodes for maintaining the rodent after being electrocuted above and in spaced relation with respect to the electrodes, and removable pivot elements for said trap door.

4. In a combined trapping and electrocuting apparatus for rodents a trapping chamber having its bottom provided with oppositely disposed, spaced electrodes normally in an open circuit, a pair of counterbalanced, oppositely shiftable, pivoted trap doors within said chamber for normally closing the upper portion thereof and adapted to be shifted to open position by a rodent on its precipitation to the chamber whereby the rodent will contact said electrodes thereby closing said circuit and electrocuting the rodent, means arranged between said electrodes for maintaining the rodent after being electrocuted above and in spaced relation with respect to the electrodes, removable pivot elements for said trap doors, means arranged over said trap doors, to provide a passage for the rodent, said passage being of less length than said trap doors whereby the rodent when reaching the inner end of the passage will be precipitated upon the trap doors, and means arranged within said passage and operated by the weight of the rodent for closing the electrical circuit to shock the rodent at his entrance into the passageway.

5. In a combined trapping and electrocuting apparatus for rodents a trapping chamber having its bottom provided with oppositely disposed, spaced electrodes normally in an open circuit, a pair of counterbalanced, oppositely shiftable, pivoted trap doors within said chamber for normally closing the upper portion thereof and adapted to be shifted to open position by a rodent on its precipitation to the chamber whereby the rodent will contact said electrodes thereby closing said circuit and electrocuting the rodent, means arranged between said electrodes for maintaining the rodent after being electrocuted above and in spaced relation with respect to the electrodes, removable pivot elements for said trap doors means arranged over said trap doors to provide a passageway for the rodent said passageway being of less length than said trap doors whereby the rodent when reaching the inner end of the passageway will be precipitated upon the trap doors, means arranged within said passageway and operated by the weight of the rodent for closing the electrical circuit to shock the rodent at his entrance into the passageway, and means at the rear of said passageway and including spaced conductors in a normally open circuit adapted to be bridged by the rodent when it springs rearwardly from the passageway thereby closing such circuit to shock the rodent as it falls towards the platforms.

6. In a combined trapping and electrocuting apparatus for rodents a trapping chamber having its bottom provided with oppositely disposed, spaced electrodes normally in an open circuit, a pair of counterbalanced, oppositely shiftable, pivoted trap doors within said chamber for normally closing the upper portion thereof and adapted to be shifted to open position by a rodent on its precipitation to the chamber whereby the rodent will contact said electrodes thereby closing said circuit and electrocuting the rodent, means arranged between said electrodes for maintaining the rodent after being electrocuted above and in spaced relation with respect to the electrodes, removable pivot elements for said trap doors, means arranged over said trap doors to provide a passageway for the rodent, said passageway being of less length than said trap doors whereby the rodent when reaching the inner end of the passageway will be precipitated upon the trap doors, means arranged within said passageway and operated by the weight of the rodent for closing the electrical circuit to shock the rodent after his entrance into the passageway, means spaced from the inner end of said passageway for supporting bait and arranged over one end of said trap doors, and means at the rear of the passageway and contacted by the rodent when it springs toward the bait for shocking it as it falls towards the platforms.

In testimony whereof, I affix my signature hereto.

LEONCIO LAGARDE.